No. 696,278. Patented Mar. 25, 1902.
A. N. STONEDAHL.
CULINARY ARTICLE.
(Application filed June 1, 1901.)
(No Model.) 2 Sheets—Sheet 1.

Witnesses
Harry L. Ames
H. Schmidt

Inventor
Alfred N. Stonedahl
By Victor J. Evans
Attorney

No. 696,278. Patented Mar. 25, 1902.
A. N. STONEDAHL.
CULINARY ARTICLE.
(Application filed June 1, 1901.)
(No Model.) 2 Sheets—Sheet 2.
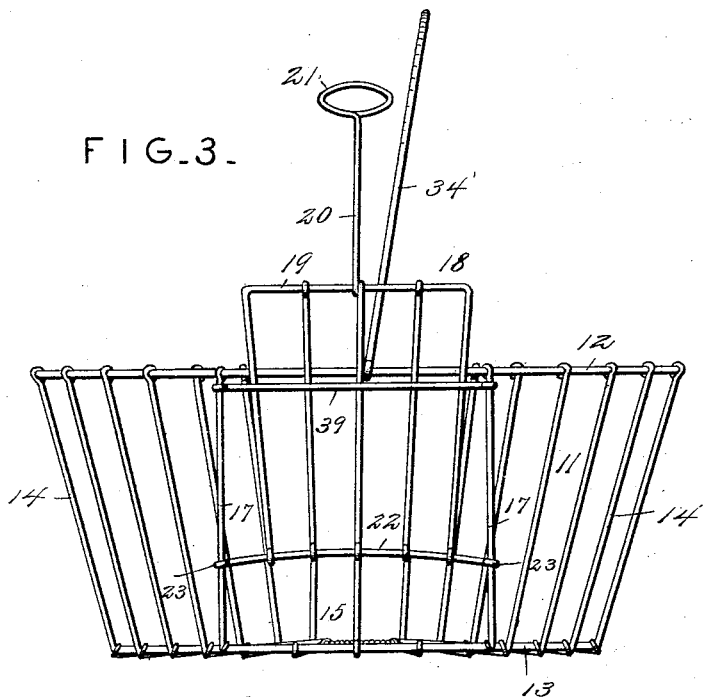
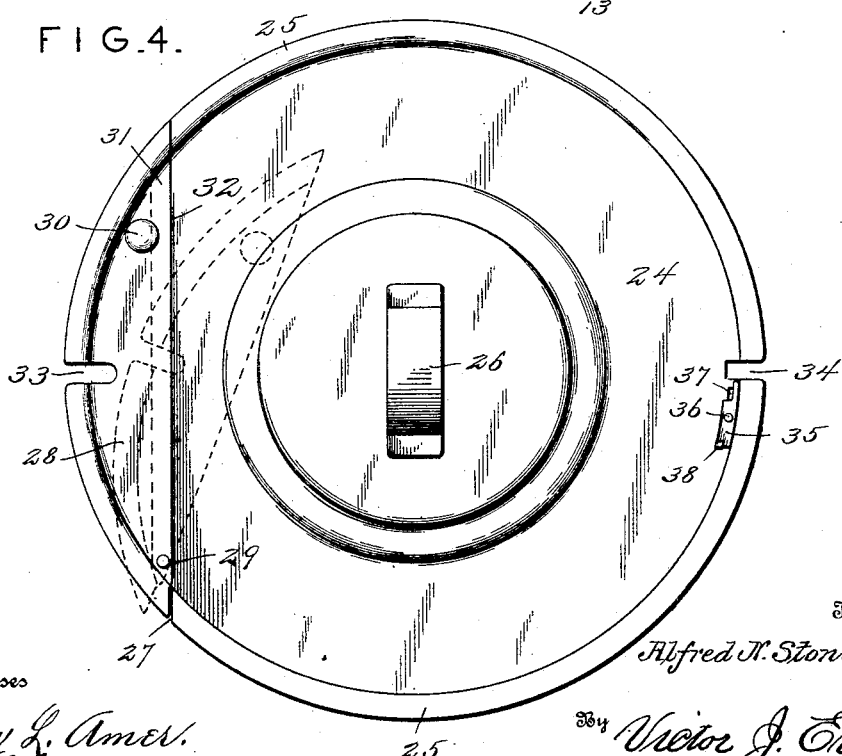
Witnesses
Harry L. Amer.
H. Schmidt.
Inventor
Alfred N. Stonedahl.
By Victor J. Evans
Attorney

UNITED STATES PATENT OFFICE.

ALFRED N. STONEDAHL, OF PORTWING, WISCONSIN.

CULINARY ARTICLE.

SPECIFICATION forming part of Letters Patent No. 696,278, dated March 25, 1902.

Application filed June 1, 1901. Serial No. 62,794. (No model.)

*To all whom it may concern:*

Be it known that I, ALFRED N. STONEDAHL, a citizen of the United States, residing at Portwing, in the county of Bayfield and State of Wisconsin, have invented new and useful Improvements in Culinary Articles, of which the following is a specification.

This invention relates to that class of culinary articles employed for straining vegetables and other articles cooked in a boiler, the object of the present invention being to provide a strainer adapted to be placed in a suitable vessel or boiler and to contain the vegetables or other articles to be cooked, so as to enable such articles to be placed in the boiling vessel and removed therefrom without breaking the articles, while adapting them to be thoroughly strained preparatory to depositing them in the dishes or vessels in which they are finally served.

One of the objects of the invention is to provide the body of the strainer with a slide which controls an opening in one side thereof, through which the cooked articles may be discharged.

Another object of the invention is to provide a detachable cover for the strainer, which may also be utilized as a cover for the kettle or vessel in which the strainer is placed, said lid having combined therewith means whereby it may be locked to the strainer and readily detached and removed therefrom.

With the above and other objects in view the invention consists in certain novel features and details of construction and arrangement of parts, as hereinafter fully described, illustrated, and claimed.

Figure 1:
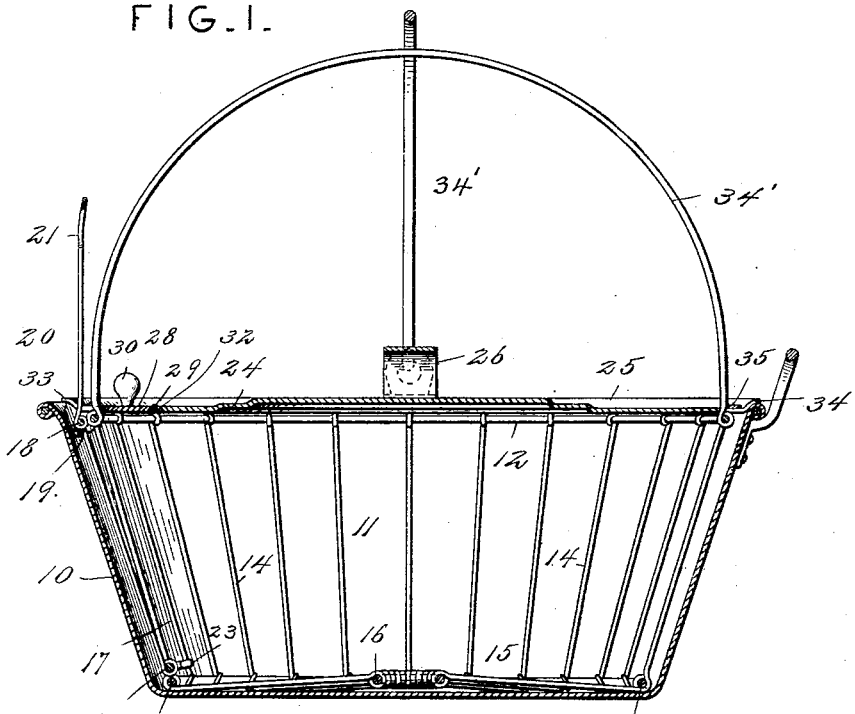
Figure 2:
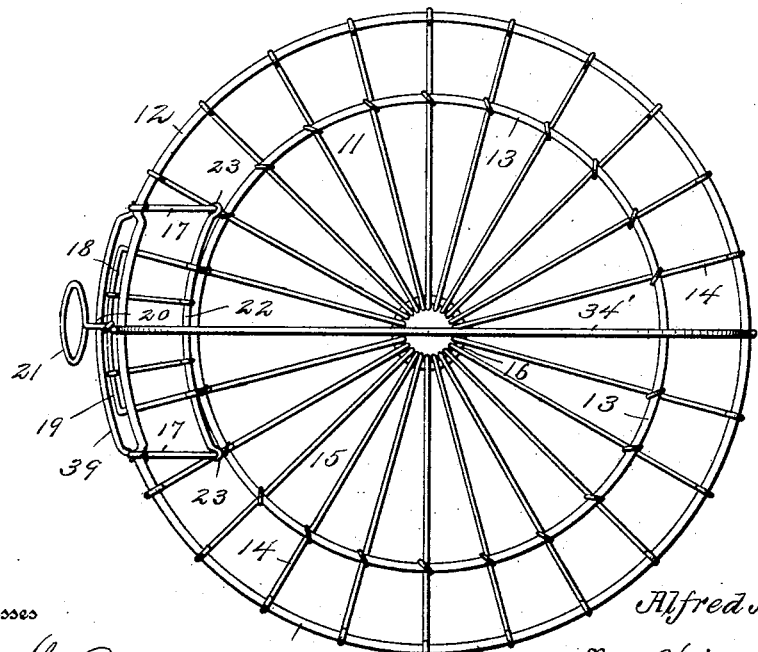

In the accompanying drawings, Figure 1 is a central vertical section through a vessel or boiler, showing the strainer, also in section, placed therein and the lid in position thereon. Fig. 2 is a plan view of the strainer with the lid removed. Fig. 3 is a side elevation of the strainer with the slide partially elevated. Fig. 4 is a top plan view of the detachable lid, showing the retracted position of the lid-segments in dotted lines.

Like numerals of reference denote like parts in all figures of the drawings.

Referring to Fig. 1 of the drawings, 10 designates a boiler or vessel, in which the strainer (indicated at 11) is adapted to be placed. The strainer is composed, essentially, of an upper ring 12 and a lower ring 13, the said rings being connected by a plurality of wires 14, which between the upper and lower rings form the sides of the strainer or, as it may properly be termed, "basket." The wires 14 are coiled one or more times around the lower ring 13 and then are extended inward radially toward the center of the strainer to form an open-work bottom 15, the inner ends of the wires being finally connected to a center ring 16 by wrapping the wires around said ring or connecting them therewith in any other convenient manner.

At one side of the strainer or basket a space or discharge-opening is left bounded by the top and bottom rings and at the sides by wires 17, which are arranged substantially in parallelism to form guides for a slide 18, which consists of a wire frame constructed similarly to the sides of the strainer and comprising a top bar 19, with which is connected an upwardly-extending handle 20, terminating in a loop or finger-grip 21 at the top. The lower end of the slide has connected therewith a slide-bar 22, the opposite ends of which are bent to form eyes or runners 23, which embrace and are adapted to slide up and down upon the guides 17, thus holding the slide securely in place on the strainer, while allowing it to be opened and closed for permitting the cooked articles to be dumped from the strainer into the serving-dishes. The upper portion of the slide is held between and guided by the top ring 12 and a keeper 39, consisting, preferably, of a piece of wire having its ends fastened to the upper portions of the guide-wire 17.

In connection with the strainer hereinabove described I employ a lid 24, preferably constructed of thin sheet metal and provided with a surrounding upstanding flange or rim 25, adapted to fit over the top ring 12 of the strainer. The lid is provided with a centrally-arranged bail-shaped handle 26, and at one side the lid is cut away, as shown at 27, and provided with a horizontally-slidable lid-segment 28, pivotally connected near one end, as at 29, to the main body of the lid and provided adjacent to its opposite or free end with an operating-knob 30. The lid 24 is provided with a projecting ledge or flange 31, upon which the inner meeting edge of the segment 28 is supported, said flange being illustrated in dotted lines in Fig. 4. The ledge or flange 31 is located in a lower plane than the body of the lid, thereby forming a rabbet in which the inner edge of the lid-segment is received and seated, and a shoulder 32, against which the inner edge of the segment abuts, whereby said segment is held in proper position when moved outward. To throw the segment inward, it is elevated by means of the knob 30 sufficiently to disengage the segment from the shoulder 32, whereupon the segment may be moved inward for the purpose of removing the lid from the strainer or basket.

The lid-segment is provided about centrally with a bail-notch 33 and at a point diametrically opposite the body of the lid is provided with another bail-notch 34, the said notches being designed to receive and fit the lower ends of the bail 34', which is connected with the strainer or basket for enabling the latter to be handled with facility.

In order to lock the lid upon the strainer, I provide a sliding lock or bolt 35, arranged adjacent to the notch opposite the lid-segment, said lock or bolt being slidingly connected with the lid by means of a pin 36, working in a curved slot 37 in the lid, as shown in Fig. 4. The lock or bolt 35 is provided with an operating-knob or finger-piece 38, which enables it to be readily slid back and forth. When the lid is placed on the strainer with the bail in the notch 34, the lock or bolt 35 is pushed across the notch behind the bail, and while enabling the lid to be raised for inspecting the contents of the vessel said lock prevents the lid from falling off the strainer. When the lid is not in use upon the strainer, it may be utilized as a cover for any other boiler or vessel of corresponding size.

The strainer hereinabove described is convenient and practical in use and will be of assistance to cooks and enable them to handle with safety such articles as are subjected to a boiling process and will also enable such articles to be handled with ease after the cooking operation and without danger of breaking, mashing, or otherwise mutilating the articles.

I do not desire to be limited to the exact details of construction and arrangement hereinabove set forth and accordingly reserve the right to change, modify, or vary the construction within the scope of the appended claims.

Having thus fully described my invention, what I claim as new, and desire to secure by Letters Patent, is—

1. The combination with a strainer or basket having a carrying-bail; of a removable lid therefor provided at one side with a horizontally-slidable and pivoted lid-segment, said lid-segment having a shouldered engagement with the body of the lid and the lid being provided at diametrically opposite points with bail-receiving notches, one of which is formed in the lid-segment.

2. The combination with a strainer or basket having a carrying-bail; of a removable lid therefor provided at one side with a horizontally-slidable and pivoted lid-segment; said lid-segment being pivoted to the body of the lid at or near one end and provided at its opposite end with an operating-knob, the lid-segment having a rabbeted and shouldered engagement with the body of the lid, and together with the body of the lid provided with diametrically opposite bail-receiving notches; and means for locking the body of the lid to the strainer or basket.

In testimony whereof I have affixed my signature in presence of two witnesses.

ALFRED N. STONEDAHL.

Witnesses:
GEO. A. HOWARD,
NILS JOHNSON.